US011033114B2

(12) United States Patent
DeMoss et al.

(10) Patent No.: US 11,033,114 B2
(45) Date of Patent: Jun. 15, 2021

(54) COIL-IN-COIL SPRING WITH VARIABLE LOADING RESPONSE AND MATTRESSES INCLUDING THE SAME

(71) Applicant: Sealy Technology, LLC, Trinity, NC (US)

(72) Inventors: Larry K. DeMoss, Greensboro, NC (US); Brian M. Manuszak, Thomasville, NC (US); Allen M. Platek, Jamestown, NC (US); Kevin Tar, Summerfield, NC (US)

(73) Assignee: Sealy Technology, LLC, Trinity, NC (US)

( * ) Notice: Subject to any disclaimer, the term of this patent is extended or adjusted under 35 U.S.C. 154(b) by 162 days.

(21) Appl. No.: 16/061,886

(22) PCT Filed: Dec. 17, 2015

(86) PCT No.: PCT/US2015/066278
§ 371 (c)(1),
(2) Date: Jun. 13, 2018

(87) PCT Pub. No.: WO2017/105454
PCT Pub. Date: Jun. 22, 2017

(65) Prior Publication Data
US 2018/0368585 A1 Dec. 27, 2018

(51) Int. Cl.
*A47C 27/06* (2006.01)
*F16F 1/02* (2006.01)
(Continued)

(52) U.S. Cl.
CPC .......... *A47C 27/064* (2013.01); *A47C 27/065* (2013.01); *A47C 27/068* (2013.01);
(Continued)

(58) Field of Classification Search
CPC ... A47C 27/064; A47C 27/068; A47C 27/065; A47C 27/148; A47C 27/061;
(Continued)

(56) References Cited

U.S. PATENT DOCUMENTS 26,954 A 1/1860 Peck, Jr.
44,793 A 10/1864 Fuller
(Continued)

FOREIGN PATENT DOCUMENTS

AT 309725 T 12/2005
AU 2457571 A 7/1972
(Continued)

OTHER PUBLICATIONS

Extended European Search Report for EP Application No. 15910925.5 dated May 15, 2019.
(Continued)

*Primary Examiner* — Robert G Santos
*Assistant Examiner* — Alison N Labarge
(74) *Attorney, Agent, or Firm* — Middleton Reutlinger (57) ABSTRACT

A coil-in-coil spring is provided that exhibits a variable loading response as the spring is compressed. The coil-in-coil spring comprises a continuous wire forming' an inner coil having a substantially conical shape and an outer coil extending around the inner coil and having a substantially cylindrical shape. The inner coil includes a plurality of helical convolutions with diameters that progressively decrease as the plurality of helical convolutions extend from a lower end of the coil-in-coil spring to an upper end convolution of the inner coil. The inner coil also has an uncompressed height that is about 75% of the uncompressed height of the outer coil, A mattress is further provided and includes the coil-in-coil springs arranged in a matrix.

18 Claims, 3 Drawing Sheets

(51) Int. Cl.
 *A47C 27/14* (2006.01)
 *B68G 9/00* (2006.01)
(52) U.S. Cl.
 CPC ............ *F16F 1/028* (2013.01); *A47C 27/148* (2013.01); *B68G 9/00* (2013.01)
(58) Field of Classification Search
 CPC .............. A47C 27/062; A47C 23/0433; A47C 23/0435; F16F 1/028; F16F 3/00; F16F 3/04; F16F 3/06; B68G 9/00
 See application file for complete search history.

(56) References Cited

U.S. PATENT DOCUMENTS

| | | | |
|---|---|---|---|
| 85,938 A | 1/1869 | Kirkpatrick | |
| 140,975 A | 7/1873 | Van Wert et al. | |
| 184,703 A | 11/1876 | Camp | |
| 274,715 A | 3/1883 | Buckley | |
| 380,651 A | 4/1888 | Fowler et al. | |
| 399,867 A | 3/1889 | Gail et al. | |
| 409,024 A | 5/1889 | Wagner et al. | |
| 485,652 A | 11/1892 | Pfingst | |
| 569,256 A | 10/1896 | Van Cise | |
| D28,896 S | 6/1898 | Comstock | |
| 804,352 A | 11/1905 | Van Cise | |
| 837,751 A * | 12/1906 | Summers | F16F 3/04 5/246 |
| 859,409 A | 7/1907 | Radarmacher | |
| 1,025,489 A | 5/1912 | Thompson | |
| 1,192,510 A * | 7/1916 | Fischmann | A47C 27/063 5/655.8 |
| 1,211,267 A | 1/1917 | Young | |
| 1,250,892 A | 12/1917 | Johnson | |
| 1,253,414 A | 1/1918 | D'Arcy | |
| 1,284,384 A | 11/1918 | Lewis | |
| 1,337,320 A | 4/1920 | Karr | |
| 1,344,636 A | 6/1920 | Jackson | |
| 1,744,389 A | 1/1930 | Karr | |
| 1,745,892 A | 2/1930 | Edwards | |
| 1,745,986 A | 2/1930 | Edwards | |
| 1,751,261 A | 3/1930 | Wilson | |
| 1,798,885 A | 3/1931 | Karr | |
| 1,804,821 A | 5/1931 | Stackhouse | |
| 1,839,325 A | 1/1932 | Marquardt | |
| 1,879,172 A | 9/1932 | Gail | |
| 1,907,324 A | 5/1933 | Kirchner | |
| 1,938,489 A | 12/1933 | Karr | |
| 1,950,770 A | 3/1934 | Bayer | |
| 1,989,302 A | 1/1935 | Wilmot | |
| 2,054,868 A | 9/1936 | Schwartzman | |
| D109,730 S | 5/1938 | Powers | |
| 2,148,961 A | 2/1939 | Pleet | |
| 2,214,135 A | 9/1940 | Hickman | |
| 2,348,897 A | 5/1944 | Gladstone | |
| 2,403,043 A | 7/1946 | Bowersox | |
| 2,480,158 A | 8/1949 | Owen | |
| 2,562,099 A | 7/1951 | Hilton | |
| 2,614,681 A | 10/1951 | Keil | |
| 2,577,812 A | 12/1951 | Samel | |
| 2,611,910 A | 9/1952 | Bell | |
| 2,617,124 A | 11/1952 | Johnson | |
| 2,681,457 A | 6/1954 | Rymland | |
| 2,866,433 A | 12/1958 | Kallick et al. | |
| 2,889,562 A | 6/1959 | Gleason | |
| 2,972,154 A | 2/1961 | Raszinski | |
| 3,083,381 A | 4/1963 | Bailey | |
| 3,089,154 A | 5/1963 | Boyles | |
| 3,107,367 A | 10/1963 | Nachman | |
| 3,173,159 A | 3/1965 | Hart | |
| 3,256,535 A | 6/1966 | Anson | |
| 3,430,275 A | 3/1969 | Janapol | |
| 3,517,398 A | 6/1970 | Patton | |
| 3,533,114 A | 10/1970 | Karpen | |
| 3,538,521 A | 11/1970 | Basner | |
| 3,541,827 A | 11/1970 | Hansen | |
| 3,653,081 A | 4/1972 | Davis | |
| 3,653,082 A | 4/1972 | Davis | |
| 3,690,456 A | 9/1972 | Powers, Jr. | |
| 3,633,228 A | 11/1972 | Zysman | |
| 3,708,809 A | 1/1973 | Basner | |
| 3,735,431 A | 5/1973 | Locco | |
| 3,751,025 A | 8/1973 | Beery et al. | |
| D230,683 S | 3/1974 | Roe | |
| 3,869,739 A | 3/1975 | Klein | |
| 3,016,464 A | 11/1975 | Tyhanci | |
| 3,923,293 A | 12/1975 | Wiegand | |
| 3,938,653 A | 2/1976 | Senger | |
| 4,077,619 A | 3/1978 | Borlinghaus | |
| 4,092,749 A | 6/1978 | Klancnik | |
| 4,109,330 A | 8/1978 | Klancnik | |
| 4,111,407 A | 9/1978 | Stager | |
| 4,122,566 A | 10/1978 | Yates | |
| 4,155,130 A | 5/1979 | Roe | |
| 4,160,544 A | 7/1979 | Higgins | |
| 4,164,281 A | 8/1979 | Schnier | |
| 4,257,151 A | 3/1981 | Coots | |
| 4,357,724 A | 11/1982 | Laforest | |
| 4,388,738 A | 6/1983 | Wagner | |
| 4,439,977 A | 4/1984 | Stumpf | |
| 4,519,107 A | 5/1985 | Dillon et al. | |
| 4,523,344 A | 6/1985 | Stumpf | |
| 4,533,033 A | 8/1985 | van Wegen | |
| 4,535,978 A | 8/1985 | Wagner | |
| 4,548,390 A | 10/1985 | Sasaki | |
| 4,566,926 A | 1/1986 | Stumpf et al. | |
| 4,578,834 A | 4/1986 | Stumpf et al. | |
| 4,609,186 A | 9/1986 | Thoenen et al. | |
| 4,664,361 A | 5/1987 | Sasaki | |
| 4,726,572 A | 2/1988 | Flesher et al. | |
| 4,817,924 A | 4/1989 | Thoenen et al. | |
| 4,960,267 A | 10/1990 | Scott et al. | |
| 5,040,255 A | 8/1991 | Barber | |
| 5,127,509 A | 7/1992 | Kohlen | |
| 5,127,635 A | 7/1992 | Long et al. | |
| 5,222,264 A | 6/1993 | Morry | |
| 5,319,815 A | 6/1994 | Stumpf et al. | |
| 5,363,522 A | 11/1994 | McGraw | |
| 5,444,905 A | 8/1995 | St. Clair | |
| 5,575,460 A | 11/1996 | Knoepfel et al. | |
| 5,584,083 A | 12/1996 | Ramsey et al. | |
| 5,701,623 A | 12/1997 | May | |
| 5,713,088 A | 2/1998 | Wagner et al. | |
| 5,720,471 A | 2/1998 | Constantinescu | |
| 5,724,686 A | 3/1998 | Neal | |
| 5,787,532 A | 8/1998 | Langer et al. | |
| 5,803,440 A | 9/1998 | Wells | |
| 5,832,551 A | 11/1998 | Wagner | |
| 5,868,383 A | 2/1999 | Codos | |
| D409,024 S | 5/1999 | Wagner et al. | |
| 6,134,729 A | 10/2000 | Quintile et al. | |
| 6,149,143 A | 11/2000 | Richmond et al. | |
| 6,155,310 A | 12/2000 | Haubert et al. | |
| 6,243,900 B1 | 6/2001 | Gladney et al. | |
| 6,256,820 B1 | 7/2001 | Moser et al. | |
| 6,260,223 B1 | 7/2001 | Mossbeck et al. | |
| 6,263,533 B1 | 7/2001 | Dimitry et al. | |
| 6,272,706 B1 | 8/2001 | McCune | |
| 6,315,275 B1 | 11/2001 | Zysman | |
| 6,318,416 B1 | 11/2001 | Grueninger | |
| 6,336,305 B1 | 1/2002 | Graf et al. | |
| 6,339,857 B1 | 1/2002 | Clayton | |
| 6,354,577 B1 | 3/2002 | Quintile et al. | |
| 6,375,169 B1 | 4/2002 | McCraw et al. | |
| 6,398,199 B1 | 6/2002 | Barber | |
| 6,406,009 B1 | 6/2002 | Constantinescu et al. | |
| 6,408,469 B2 | 6/2002 | Gladney et al. | |
| 6,430,982 B2 | 8/2002 | Andrea et al. | |
| 6,467,240 B2 | 10/2002 | Zysman | |
| 6,481,701 B2 | 11/2002 | Kessen et al. | |
| 6,540,214 B2 | 4/2003 | Barber | |
| 6,640,836 B1 | 11/2003 | Haubert et al. | |
| 6,659,261 B2 | 12/2003 | Miyakawa | |

(56) References Cited

U.S. PATENT DOCUMENTS

| | | | |
|---|---|---|---|
| 6,668,406 B2 * | 12/2003 | Spinks | A47C 23/0433 |
| | | | 5/256 |
| 6,698,166 B2 | 3/2004 | Zysman | |
| 6,729,610 B2 | 5/2004 | Constantinescu | |
| 6,758,078 B2 | 6/2004 | Wells et al. | |
| 6,772,463 B2 | 8/2004 | Gladney et al. | |
| 6,883,196 B2 | 4/2005 | Barber | |
| 6,931,685 B2 | 8/2005 | Kuchel et al. | |
| 6,952,850 B2 | 10/2005 | Visser et al. | |
| 6,966,091 B2 | 11/2005 | Barber | |
| 7,044,454 B2 | 5/2006 | Colman et al. | |
| 7,048,263 B2 | 5/2006 | Ahlqvist | |
| 7,063,309 B2 | 6/2006 | Colman | |
| 7,086,425 B2 | 8/2006 | Widmer | |
| D527,932 S | 9/2006 | Eigenmann et al. | |
| D528,329 S | 9/2006 | Eigenmann et al. | |
| D528,330 S | 9/2006 | Eigenmann et al. | |
| D528,833 S | 9/2006 | Eigenmann et al. | |
| D530,120 S | 10/2006 | Eigenmann et al. | |
| D531,436 S | 11/2006 | Eigenmann et al. | |
| 7,168,117 B2 | 1/2007 | Gladney et al. | |
| 7,178,187 B2 | 2/2007 | Barman et al. | |
| 7,185,379 B2 | 3/2007 | Barman | |
| 7,219,381 B2 | 5/2007 | Damewood et al. | |
| 7,287,291 B2 | 10/2007 | Carlitz | |
| 7,386,897 B2 | 6/2008 | Eigenmann et al. | |
| 7,404,223 B2 | 7/2008 | Manuszak et al. | |
| D579,242 S * | 10/2008 | Kilic | D6/718.31 |
| 7,578,016 B1 | 8/2009 | McCraw | |
| 7,636,971 B2 | 12/2009 | Demoss | |
| 7,748,065 B2 | 7/2010 | Edling | |
| D621,186 S * | 8/2010 | DeMoss | D6/718.31 |
| D621,198 S | 8/2010 | Morrison | |
| D622,088 S | 8/2010 | Morrison | |
| 7,805,790 B2 | 10/2010 | Demoss | |
| 7,814,594 B2 | 10/2010 | DeFranks et al. | |
| D633,322 S | 3/2011 | Morrison | |
| 7,908,693 B2 | 3/2011 | Demoss | |
| 7,921,561 B2 | 4/2011 | Eigenmann et al. | |
| D640,082 S | 6/2011 | Morrison | |
| D649,385 S | 11/2011 | Freese et al. | |
| D651,828 S | 1/2012 | DeMoss et al. | |
| D652,234 S | 1/2012 | Demoss et al. | |
| D652,235 S | 1/2012 | Demoss et al. | |
| 8,157,084 B2 | 4/2012 | Begin et al. | |
| D659,459 S | 5/2012 | Jung et al. | |
| D662,751 S | 7/2012 | Morrison et al. | |
| D662,752 S | 7/2012 | Morrison et al. | |
| 8,230,538 B2 | 7/2012 | Moret et al. | |
| D666,448 S | 9/2012 | Morrison et al. | |
| D666,449 S | 9/2012 | Morrison et al. | |
| D696,048 S | 12/2013 | Morrison | |
| 8,689,380 B2 | 4/2014 | Gladney et al. | |
| D704,478 S | 5/2014 | Arnold | |
| D704,965 S | 5/2014 | Arnold | |
| 8,720,872 B2 | 5/2014 | DeMoss et al. | |
| D708,455 S | 7/2014 | Arnold | |
| 8,783,447 B1 | 7/2014 | Yohe | |
| D711,160 S | 8/2014 | Arnold | |
| 8,857,799 B2 | 10/2014 | Tyree | |
| D717,077 S | 11/2014 | Arnold | |
| D717,078 S | 11/2014 | Arnold | |
| 8,895,109 B2 | 11/2014 | Cohen | |
| D719,766 S | 12/2014 | Arnold | |
| D720,159 S | 12/2014 | Arnold | |
| 9,022,369 B2 | 5/2015 | Demoss et al. | |
| 9,085,420 B2 | 7/2015 | Williams | |
| D744,767 S | 12/2015 | Morrison et al. | |
| D744,768 S | 12/2015 | Morrison et al. | |
| 9,211,017 B2 | 12/2015 | Tyree | |
| 9,352,913 B2 | 5/2016 | Manuszak et al. | |
| 9,392,876 B2 | 7/2016 | Tyree | |
| D763,013 S | 8/2016 | Arnold | |
| D776,958 S | 1/2017 | Arnold | |
| D776,959 S | 1/2017 | Arnold | |
| 9,936,815 B2 | 4/2018 | DeMoss et al. | |
| 10,051,973 B2 | 8/2018 | Morgan et al. | |
| 10,598,242 B2 | 3/2020 | Thomas et al. | |
| 10,610,029 B2 | 4/2020 | Demoss et al. | |
| 2001/0008030 A1 | 7/2001 | Gladney et al. | |
| 2001/0013147 A1 | 8/2001 | Fogel | |
| 2002/0139645 A1 | 10/2002 | Haubert et al. | |
| 2002/0152554 A1 | 10/2002 | Spinks et al. | |
| 2003/0093864 A1 | 5/2003 | Visser et al. | |
| 2003/0177585 A1 | 9/2003 | Gladney et al. | |
| 2004/0046297 A1 | 3/2004 | Demoss et al. | |
| 2004/0074005 A1 | 4/2004 | Kuchel | |
| 2004/0079780 A1 | 4/2004 | Kato | |
| 2004/0133988 A1 | 7/2004 | Barber | |
| 2004/0237204 A1 | 12/2004 | Antinori | |
| 2004/0261187 A1 | 12/2004 | Van Patten | |
| 2005/0246839 A1 | 11/2005 | Noswonger | |
| 2006/0042016 A1 | 3/2006 | Barman et al. | |
| 2007/0017033 A1 | 1/2007 | Antinori | |
| 2007/0017035 A1 | 1/2007 | Chen et al. | |
| 2007/0094807 A1 | 5/2007 | Wells | |
| 2007/0124865 A1 | 6/2007 | Stjerna | |
| 2007/0169275 A1 | 7/2007 | Manuszak et al. | |
| 2007/0220680 A1 | 9/2007 | Miller et al. | |
| 2007/0220681 A1 | 9/2007 | Gladney et al. | |
| 2007/0289068 A1 | 12/2007 | Edling | |
| 2008/0017255 A1 | 1/2008 | Petersen | |
| 2008/0017271 A1 | 1/2008 | Haltiner | |
| 2008/0115287 A1 | 5/2008 | Eigenmann et al. | |
| 2009/0193591 A1 | 8/2009 | DeMoss et al. | |
| 2010/0180385 A1 | 7/2010 | Petrolati et al. | |
| 2010/0212090 A1 | 8/2010 | Stjerna | |
| 2010/0257675 A1 * | 10/2010 | DeMoss | A47C 27/064 |
| | | | 5/720 |
| 2011/0094039 A1 | 4/2011 | Tervo et al. | |
| 2011/0099722 A1 | 5/2011 | Moret et al. | |
| 2011/0107523 A1 | 5/2011 | Moret et al. | |
| 2011/0148018 A1 * | 6/2011 | DeFranks | A47C 23/0438 |
| | | | 267/166.1 |
| 2012/0047658 A1 | 3/2012 | Demoss et al. | |
| 2012/0159715 A1 | 6/2012 | Jung et al. | |
| 2012/0180224 A1 | 7/2012 | Demoss et al. | |
| 2013/0031726 A1 | 2/2013 | Demoss | |
| 2014/0033441 A1 | 2/2014 | Morgan et al. | |
| 2014/0373280 A1 | 12/2014 | Mossbeck et al. | |
| 2015/0342362 A1 | 12/2015 | Demoss et al. | |
| 2015/0374136 A1 | 12/2015 | Mikkelsen et al. | |
| 2016/0029809 A1 | 2/2016 | Shive | |
| 2016/0037938 A1 | 2/2016 | Tyree | |
| 2016/0255964 A1 | 9/2016 | Thomas | |
| 2016/0316927 A1 | 11/2016 | Thomas et al. | |
| 2018/0055240 A1 | 3/2018 | Demoss et al. | |
| 2018/0168360 A1 | 6/2018 | Thomas et al. | |
| 2018/0368585 A1 | 12/2018 | Demoss et al. | |
| 2019/0000239 A1 | 1/2019 | Thomas et al. | |
| 2019/0343294 A1 | 11/2019 | Demoss et al. | |
| 2020/0018370 A1 | 1/2020 | Demoss et al. | |

FOREIGN PATENT DOCUMENTS

| | | |
|---|---|---|
| AU | 2964877 A | 4/1979 |
| AU | 4825179 A | 1/1980 |
| AU | 515761 B2 | 4/1981 |
| AU | 3437584 | 4/1985 |
| AU | 7297987 A | 11/1987 |
| AU | 4609889 | 4/1990 |
| AU | 9005391 A | 2/1992 |
| AU | 4662597 | 4/1998 |
| AU | 6975298 A | 11/1998 |
| AU | 4994901 A | 12/2001 |
| AU | 7367201 A | 1/2002 |
| AU | 2001297805 | 4/2003 |
| AU | 2003205072 A1 | 9/2003 |
| AU | 2003268425 A1 | 4/2004 |
| AU | 2004283189 A1 | 5/2005 |
| AU | 2005280479 A1 | 3/2006 |
| AU | 2001249949 B2 | 11/2006 |
| AU | 2008219052 | 8/2008 |
| AU | 2009206026 A1 | 7/2009 |

(56) References Cited

FOREIGN PATENT DOCUMENTS

| | | |
|---|---|---|
| AU | 2009212687 A1 | 8/2009 |
| AU | 2010202712 A1 | 7/2010 |
| AU | 2009342701 A1 | 10/2010 |
| AU | 2010236454 A1 | 10/2011 |
| AU | 2011338830 A1 | 7/2013 |
| AU | 2012204359 A1 | 7/2013 |
| AU | 2014236431 A1 | 10/2015 |
| AU | 2012207475 B2 | 10/2016 |
| AU | 2015396842 A1 | 12/2017 |
| BR | PI0112471 A | 8/2003 |
| BR | 0115070-7 | 1/2004 |
| BR | PI0111389 A | 2/2004 |
| BR | PI0306959 A | 11/2004 |
| BR | PI0313096 A | 7/2005 |
| BR | PI0415440 A | 12/2006 |
| BR | PI0514799 A | 6/2008 |
| BR | PI0906744 A2 | 7/2015 |
| BR | PI1014650 A2 | 4/2016 |
| BR | PI0908426 A2 | 5/2016 |
| BR | PI1314067 A2 | 9/2016 |
| BR | PI1317409 A2 | 10/2016 |
| BR | PI1318278 A2 | 11/2016 |
| BR | PI1318279 A2 | 11/2016 |
| CA | 721181 A | 11/1965 |
| CA | 730050 A | 3/1966 |
| CA | 730051 A | 3/1966 |
| CA | 935574 A1 | 10/1973 |
| CA | 938740 A1 | 12/1973 |
| CA | 1052916 A1 | 4/1979 |
| CA | 1127324 A1 | 7/1982 |
| CA | 1179074 A1 | 12/1984 |
| CA | 1290472 C | 10/1991 |
| CA | 2411702 A1 | 12/2001 |
| CA | 2415904 A1 | 1/2002 |
| CA | 2430330 | 4/2003 |
| CA | 2471977 A1 | 7/2003 |
| CA | 2495780 A1 | 3/2004 |
| CA | 2539008 A1 | 5/2005 |
| CA | 2578144 A1 | 3/2006 |
| CA | 2678855 A1 | 8/2008 |
| CA | 2712457 | 1/2009 |
| CA | 2714397 A1 | 8/2009 |
| CA | 2758906 A1 | 10/2010 |
| CA | 2708212 A1 | 2/2011 |
| CA | 140155 S | 12/2011 |
| CA | 140156 S | 12/2011 |
| CA | 2820219 A1 | 6/2012 |
| CA | 2823387 A1 | 7/2012 |
| CA | 2824985 A1 | 7/2012 |
| CA | 2825044 A1 | 7/2012 |
| CA | 2906122 A1 | 9/2014 |
| CA | 2988071 A1 | 12/2016 |
| CA | 3008818 | 6/2017 |
| CA | 2820219 C | 10/2017 |
| CA | 172824 S | 11/2017 |
| CA | 172825 S | 11/2017 |
| CA | 172826 S | 11/2017 |
| CA | 172827 S | 11/2017 |
| CA | 172828 S | 11/2017 |
| CA | 172829 S | 11/2017 |
| CA | 172830 S | 11/2017 |
| CA | 176681 S | 11/2017 |
| CA | 176683 S | 11/2017 |
| CA | 176684 S | 11/2017 |
| CA | 176685 S | 11/2017 |
| CA | 176686 S | 11/2017 |
| CA | 176705 S | 11/2017 |
| CA | 176706 S | 11/2017 |
| CH | 406554 A | 1/1966 |
| CN | 1431879 A | 7/2003 |
| CN | 1682040 | 10/2005 |
| CN | 1682040 A | 10/2005 |
| CN | 1230267 | 12/2005 |
| CN | 1964650 A | 5/2007 |
| CN | 101052331 A | 10/2007 |
| CN | 101977535 A | 2/2011 |
| CN | 101990413 A | 3/2011 |
| CN | 301837054 S | 2/2012 |
| CN | 102395302 A | 3/2012 |
| CN | 302060365 S | 9/2012 |
| CN | 302078253 S | 9/2012 |
| CN | 302078254 S | 9/2012 |
| CN | 103313629 A | 9/2013 |
| CN | 103313630 A | 9/2013 |
| CN | 103327850 A | 9/2013 |
| CN | 103327851 A | 9/2013 |
| CN | 105377082 A | 3/2016 |
| CN | 103313629 B | 8/2016 |
| DE | 2113901 A1 | 2/1972 |
| DE | 2927262 A1 | 1/1980 |
| DE | 69734681 D1 | 12/2005 |
| DE | 102010061089 A1 * | 6/2012 ........... A47C 27/065 |
| DK | 2418985 T3 | 6/2016 |
| DK | 2967222 T3 | 3/2018 |
| EM | 001620725-0001 | 10/2009 |
| EP | 156883 A1 | 10/1985 |
| EP | 269681 A1 | 6/1988 |
| EP | 1018911 A1 | 7/2000 |
| EP | 1286611 A1 | 3/2003 |
| EP | 1327087 A1 | 7/2003 |
| EP | 1337357 | 8/2003 |
| EP | 1537045 A2 | 6/2005 |
| EP | 1682320 A2 | 7/2006 |
| EP | 1784099 | 5/2007 |
| EP | 2112896 | 11/2009 |
| EP | 2112896 A2 | 11/2009 |
| EP | 2244607 A1 | 11/2010 |
| EP | 2296509 A1 | 3/2011 |
| EP | 2418985 A1 | 2/2012 |
| EP | 2648573 A1 | 10/2013 |
| EP | 2661196 A1 | 11/2013 |
| EP | 2665391 A1 | 11/2013 |
| EP | 2665392 A1 | 11/2013 |
| EP | 2946696 A1 | 11/2015 |
| EP | 2954801 A1 | 12/2015 |
| EP | 2967222 A1 | 1/2016 |
| EP | 3302179 A1 | 4/2018 |
| EP | 3389450 | 10/2018 |
| EP | 3389450 A1 | 10/2018 |
| EP | 3405073 A1 | 11/2018 |
| EP | 3554315 A1 | 10/2019 |
| EP | 3562351 A1 | 11/2019 |
| ES | 482352 A1 | 4/1980 |
| ES | 252961 U | 2/1981 |
| ES | 2249804 T3 | 4/2006 |
| ES | 2575555 T3 | 6/2016 |
| ES | 2660293 T3 | 3/2018 |
| FR | 2430743 A1 | 2/1980 |
| GB | 494428 | 10/1938 |
| GB | 976021 A | 11/1964 |
| GB | 1284690 A | 8/1972 |
| GB | 2025217 A | 1/1980 |
| GB | 1577584 A | 10/1980 |
| GB | 2215199 A | 9/1989 |
| IN | 1686DELNP2007 | 8/2007 |
| IN | 7883DELNP2011 | 9/2013 |
| IN | 5595DELNP2013 | 12/2014 |
| IN | 5701DELNP2013 | 12/2014 |
| IN | 6306DELNP2013 | 12/2014 |
| IN | 6307DELNP2013 | 12/2014 |
| IN | 201717043686 | 1/2018 |
| JP | 53065668 A | 7/1978 |
| JP | 55014095 A | 1/1980 |
| JP | 63035206 A | 2/1988 |
| JP | 01004763 B | 1/1989 |
| JP | 4084750 | 4/2008 |
| JP | 2015051285 A | 3/2015 |
| JP | 5710124 | 4/2015 |
| KR | 19830002865 A | 5/1983 |
| KR | 19830002865 B1 | 12/1983 |
| KR | 100355167 B1 | 9/2002 |
| KR | 1020070026321 A | 3/2007 |
| KR | 10-0730278 | 6/2007 |
| KR | 100730278 B1 | 6/2007 |

(56) References Cited

FOREIGN PATENT DOCUMENTS

| | | |
|---|---|---|
| KR | 100735773 B1 | 6/2007 |
| KR | 1020070057164 A | 6/2007 |
| KR | 1020090122230 A | 11/2009 |
| KR | 1020120024585 A | 3/2012 |
| KR | 1020120030303 A | 3/2012 |
| KR | 1020130140089 A | 12/2013 |
| KR | 1020140006899 A | 1/2014 |
| KR | 1020140031187 A | 3/2014 |
| KR | 1020140032995 A | 3/2014 |
| KR | 101559748 B1 | 10/2015 |
| KR | 1020170081298 A | 7/2017 |
| KR | 101970351 B1 | 4/2019 |
| KR | 102070175 B1 | 1/2020 |
| KR | 102090031 B1 | 3/2020 |
| MX | 150175 A | 3/1984 |
| MX | PA02011719 A | 5/2003 |
| MX | PA03004813 | 3/2004 |
| MX | PA03000300 A | 12/2004 |
| MX | PA04006971 A | 12/2004 |
| MX | PA05002627 A | 9/2005 |
| MX | PA06004139 A | 6/2006 |
| MX | 2007002292 A | 10/2007 |
| MX | 2009008861 A | 11/2009 |
| MX | 2010007835 A | 9/2010 |
| MX | 2010008675 A | 10/2010 |
| MX | 2011010876 A | 11/2011 |
| MX | 2010007836 A | 9/2012 |
| MX | 2013006310 A | 7/2013 |
| MX | 2013007934 A | 8/2013 |
| MX | 314236 | 10/2013 |
| MX | 2013008403 A | 10/2013 |
| MX | 2013008404 A | 10/2013 |
| MX | 2015012909 A | 12/2015 |
| NZ | 525792 | 11/2004 |
| NZ | 579217 | 5/2011 |
| NZ | 587211 | 10/2012 |
| SG | 98527 | 7/2005 |
| TW | 512085 | 12/2002 |
| TW | 559554 A | 11/2003 |
| TW | 200611658 A | 4/2006 |
| TW | 201230986 A | 8/2012 |
| WO | 8501424 A1 | 4/1985 |
| WO | 8706987 A1 | 11/1987 |
| WO | 0193726 A1 | 12/2001 |
| WO | 0204838 A1 | 1/2002 |
| WO | 0204838 A9 | 2/2003 |
| WO | 03061932 A2 | 7/2003 |
| WO | 2004024617 A2 | 3/2004 |
| WO | 2005039849 A2 | 5/2005 |
| WO | 2006026062 A2 | 3/2006 |
| WO | 2008103332 A2 | 8/2008 |
| WO | 2008143595 | 11/2008 |
| WO | 2009091945 A1 | 7/2009 |
| WO | 2009099993 A1 | 8/2009 |
| WO | 2010117352 A1 | 10/2010 |
| WO | 2010120886 A1 | 10/2010 |
| WO | 2012027663 A1 | 3/2012 |
| WO | 2012078398 A1 | 6/2012 |
| WO | 2012088224 A1 | 6/2012 |
| WO | 2012094468 A1 | 7/2012 |
| WO | 2012097120 A2 | 7/2012 |
| WO | 2012099812 A1 | 7/2012 |
| WO | 2012099936 A1 | 7/2012 |
| WO | 2012155131 A1 | 11/2012 |
| WO | 2012097120 A3 | 6/2014 |
| WO | 2014152935 A1 | 9/2014 |
| WO | 2014152953 A1 | 9/2014 |
| WO | 2016122453 A1 | 8/2016 |
| WO | 2016195700 A1 | 12/2016 |
| WO | 2017105454 A1 | 6/2017 |
| WO | 2017116405 | 7/2017 |
| WO | 2017116405 A1 | 7/2017 |
| WO | 2017116406 | 7/2017 |
| WO | 2017116406 A1 | 7/2017 |
| WO | 2017127082 A1 | 7/2017 |
| WO | 20170127082 | 7/2017 |
| WO | 2017200839 A2 | 11/2017 |
| WO | 2018112341 A1 | 6/2018 |
| WO | 2018118035 | 6/2018 |
| WO | 2018118035 A1 | 6/2018 |
| WO | 2018118037 | 6/2018 |
| WO | 2018118037 A1 | 6/2018 |
| WO | 2018200679 A1 | 11/2018 |
| WO | 2019089429 A1 | 5/2019 |
| ZA | 2003/03457 | 5/2004 |
| ZA | 2005/01090 | 10/2006 |

OTHER PUBLICATIONS

Korean Intellectual Property Office, International Search Report and Written Opinion dated Sep. 6, 2016 for PCT/US2015/066278, 14 pages, Daejeon, Republic of Korea.
European Patent Office, Search Report for EP App. No. 15910925 dated May 15, 2019, 4 pages.
U.S. Appl. No. 62/434,668, filed Dec. 15, 2016, Demoss et al.

\* cited by examiner

FIG. 4

COIL-IN-COIL SPRING WITH VARIABLE LOADING RESPONSE AND MATTRESSES INCLUDING THE SAME

This 371 National Stage Entry Patent Application claims priority to and benefit of, under 35 U.S.C. § 119(e), PCT application number PCT/US2015/066278, filed Dec. 17, 2015, titled, "Coil-In-Coil Spring With Variable Loading Response And Mattresses Including The Same", which is incorporated by reference herein.

TECHNICAL FIELD

The present embodiments relate to coil-in-coil springs and mattresses including coil-in-coil springs. In particular, the present invention relates to coil-in-coil springs which are made of a continuous wire and exhibit a variable loading response when compressed.

BACKGROUND

Typically, when a uniaxial load is applied to a spring, the spring exhibits a linear compression rate. That is to say, it takes twice as much force to compress a typical spring two inches as it does to compress the same spring one inch. The linear response of springs is expressed by Hooke's law which states that the force (F) needed to extend or compress a spring by some distance (D) is proportional to that distance. This relationship is expressed mathematically as F=kD, where k represents the spring constant for a particular spring. A high spring constant indicates that the spring requires more force to compress, and a low spring constant means the spring requires less force to compress.

Linear response springs, such as wire coil springs, are commonly used as mattress innersprings in combination with padding and upholstery that surround the innersprings. Most mattress innersprings are comprised of an array of wire coil springs which are often adjoined by lacing end convolutions of the coil springs together with cross wires. An advantage of this arrangement is that it is inexpensive to manufacture. However, this type of innerspring provides a firm and rigid mattress surface.

An alternative to an innerspring mattress is a mattress constructed of one or more foam layers. Unlike an innerspring mattress comprised of an array of wire coil springs, foam mattresses exhibit a non-linear response to forces applied to the mattress. In particular, a foam mattress provides more support as the load increases. For instance, a typical foam mattress provides increased support after it has been compressed approximately 60% of the maximum compression of the foam. The non-linear response of foam mattresses provides improved sleep comfort for a user. However, the mechanical properties of certain foam may degrade over time affecting the overall comfort of the foam mattress. Furthermore, foam mattresses are often more costly to produce than metal spring mattresses.

SUMMARY

The present embodiments relate to coil-in-coil springs that provide a variable loading response as the coil-in-coil spring is compressed. In particular, the present embodiments relate to coil-in-coil springs made of a continuous wire helically coiled such that a cylindrical outer coil extends around a conical inner coil. The coil-in-coil springs of the present embodiments are used within a mattress to provide a user positioned on the mattress increased support for portions of the user's body where a higher load is applied to the mattress. Thus, the mattress including the coil-in-coil springs provides a user the non-linear support typically seen in a foam mattress, but through the use of springs.

In some embodiments, a coil-in-coil spring is provided made of a continuous wire forming an inner coil having a substantially conical shape and an outer coil extending around the inner coil and having a substantially cylindrical shape. More specifically, the inner coil of the coil-in-coil spring includes an upper end convolution and a plurality of helical convolutions that extend in a clock-wise direction from a lower end of the coil-in-coil spring to the upper end convolution of the inner coil. Similarly, the outer coil includes an upper end convolution and a plurality of helical convolutions that extend in a counter-clockwise direction from the lower end of the coil-in-coil spring to the upper end convolution of the outer coil. Each convolution of the coil-in-coil spring is made up of a portion of the continuous wire substantially equal to about one turn of the continuous wire (i.e., about 360° of the helical path of the continuous wire). The upper end convolution of the outer coil of the coil-in-coil spring forms a substantially planar loop at the topmost portion of the coil-in-coil spring. Similarly, the lower end of the coil-in-coil spring also forms a substantially planar loop at the lowermost portion of the coil-in-coil spring. In this way, the coil-in-coil spring terminates at either end in a generally planar form which serves as the supporting end structures of the coil-in-coil spring, as further discussed below.

With further respect to the configuration of the coil-in-coil spring, the wire diameter of the continuous wire of the coil-in-coil spring ranges from about 0.072 inches to about 0.080 inches, with a preferred range from about 0.072 inches to about 0.076 inches. Furthermore, the continuous wire 20 has a tensile strength of between about 240 kpsi to about 260 kpsi, with a preferred tensile strength of about 250 kpsi.

Focusing now more specifically on the inner coil of the coil-in-coil spring, the upper end convolution has a diameter and each of the plurality of helical convolutions of the inner coil has a diameter that progressively decreases as the plurality of helical convolutions extend from the lower end of the coil-in-coil spring to the upper end convolution of the inner coil. In particular, the upper end convolution has a diameter of about 25.5 mm and each of the plurality of helical convolutions of the inner coil has a diameter that ranges from about 27.5 mm to about 57.5 mm. For example, in the some embodiments, the inner coil comprises eight helical convolutions with the first helical convolutions having a diameter of about 57.5 mm, the second helical convolution having a diameter of about 52 mm, the third helical convolution having a diameter of about 47 mm, the fourth helical convolution having a diameter of about 42.5, the fifth helical convolution having a diameter of about 38.5, the sixth helical convolution having a diameter of about 35 mm, the seventh helical convolution having a diameter of about 32 mm, and the eighth helical convolution having a diameter of about 27.5 mm.

The continuous wire also defines a pitch between each of the plurality of helical convolutions of the inner coil with the pitch between each of the plurality of helical convolutions progressively decreasing as the plurality of helical convolutions extend from the lower end of the coil-in-coil spring to the upper end convolution of the inner coil. Specifically, in the exemplary coil-in-coil spring, the pitch between each of the plurality of helical convolutions of the inner coil ranges from about 14 mm to about 28 mm. For example, in some embodiments, the pitch between the lower end of the coil-in-coil spring and the first helical convolution is about 22 mm; the pitch between the first helical convolution and the second helical convolution is about 28 mm; the pitch between the second helical convolution and the third helical convolution is about 25 mm; the pitch between the third helical convolution and the fourth helical convolution is about 23 mm; the pitch between the fourth helical convolution and the fifth helical convolution is about 21 mm; the pitch between the fifth helical convolution and the sixth helical convolution is about 18 mm; the pitch between the sixth helical convolution and the seventh helical convolution is about 16 mm; and the pitch between the seventh helical convolution and the eighth helical convolution is about 14 mm.

Turning now to the outer coil of the coil-in-coil spring, the upper end convolution of the outer coil and each of the plurality of helical convolutions of the outer coil has a diameter and the diameter of each of the plurality of helical convolutions of the outer coil are substantially equal to one another. In some embodiments, the upper end convolution of the outer coil has a diameter of about 66 mm and each of the plurality of helical convolutions of the outer coil has a diameter of about 70 mm. The continuous wire also defines a pitch between each of the plurality of helical convolutions of the outer coil, where each of the pitches are substantially equal to one another. In some embodiments, the pitch between each of the plurality of helical convolutions of the outer coil is about 66 mm.

In some embodiments, when the coil-in-coil spring is uncompressed, the outer coil has an uncompressed height of about 235 mm and the inner coil has an uncompressed height of about 175 mm or, in other words, an uncompressed height that is about 75% of the uncompressed height of the outer coil, such that the upper end convolution of the inner coil is positioned below the upper end convolution of the outer coil. In this regard, when the coil-in-coil spring is partially compressed to a first predetermined compression distance, the outer coil is typically initially compressed until the compressed height of the coil-in-coil spring (i.e., the compressed height of the outer coil) is the same as the uncompressed height of the inner coil. Thus, as the coil-in-coil spring compresses from an uncompressed state to the first predetermined compression distance, only the convolutions of the outer coil compress and, as such, an initial spring constant of the coil-in-coil spring is based solely on the outer coil. As the coil-in-coil spring is compressed beyond the first predetermined compression distance, however, both the outer coil and the inner coil compress simultaneously and, consequently, a secondary spring constant of the coil-in-coil spring is based on both the inner coil as well as the outer coil. In this way, initially the outer coil alone provides support to a user's body positioned on the coil-in-coil spring, but upon further compression, the inner coil and the outer coil act together to provide support to a portion of the user's body positioned on the coil-in-coil spring.

In another embodiment, a pocketed coil-in-coil spring is provided that includes a coil-in-coil spring as described above and that further comprises a flexible enclosure that encases the coil-in-coil spring. The flexible enclosure includes a bottom wall positioned adjacent to the lower end of the coil-in-coil spring, a top wall positioned adjacent to the upper end convolution of the outer coil of the coil-in-coil spring, and a continuous side wall that extends from the bottom wall to the top wall, such that the continuous side wall surrounds the coil-in-coil spring.

In yet another embodiment, a mattress is provided that includes a plurality of the pocketed coil-in-coil springs arranged in a matrix, such that the upper end convolutions of the outer coils of the coil-in-coil springs define a first support surface, and the lower ends of the coil-in-coil springs define a second support surface opposite the first support surface. The mattress also comprises an upper body supporting layer positioned adjacent to the first support surface, along with a lower foundation layer positioned adjacent to the second support surface. Furthermore, a side panel extends between the upper body supporting layer and the lower foundation layer around the entire periphery of the two layers, such that the pocketed coil-in-coil springs are completely surrounded.

Further features and advantages of the present invention will become evident to those of ordinary skill in the art after a study of the description, figures, and non-limiting examples in this document.

DESCRIPTION OF EXEMPLARY EMBODIMENTS

The present embodiments relate to coil-in-coil springs that provide a variable loading response as the coil-in-coil spring is compressed. In particular, the present embodiments relate to coil-in-coil springs made of a continuous wire helically coiled such that a cylindrical outer coil extends around a conical inner coil. The coil-in-coil springs are used within a mattress to provide a user positioned on the mattress increased support for portions of the user's body where a higher load is applied to the mattress. Thus, the mattress including the coil-in-coil springs of the present invention provides a user the non-linear support typically seen in a foam mattress, but through the use of springs.

Figure 1:
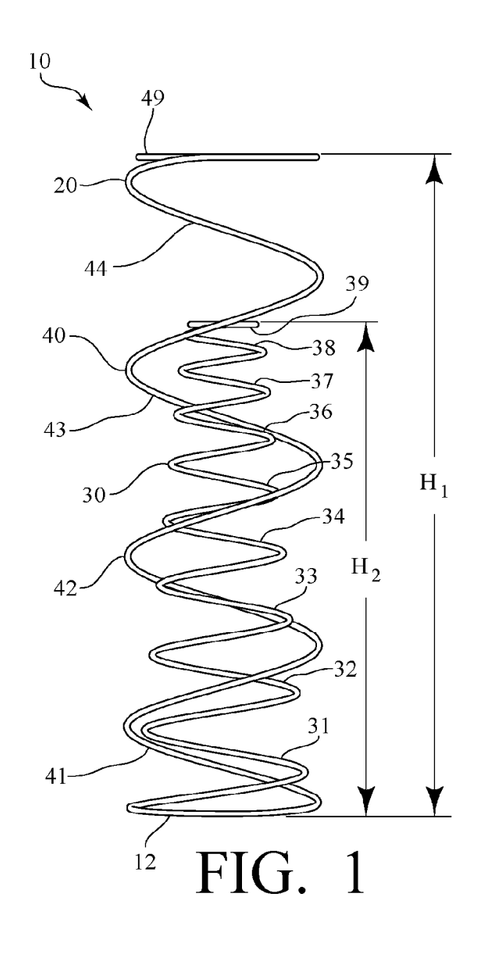
FIG. 1 is a side view of an exemplary coil-in-coil spring made in accordance with the present invention.

Referring first to FIG. 1, in one exemplary embodiment, a coil-in-coil spring 10 is provided made of a continuous wire 20 forming an inner coil 30 having a substantially conical shape and an outer coil 40 extending around the inner coil 30 and having a substantially cylindrical shape. More specifically, the inner coil 30 of the coil-in-coil spring 10 includes an upper end convolution 39 and a plurality (eight) of helical convolutions 31-38 which extend in a clock-wise direction from a lower end 12 of the coil-in-coil spring 10 to the upper end convolution 39 of the inner coil 30. Similarly, the outer coil 40 includes an upper end convolution 49 and a plurality (four) of helical convolutions 41-44 which extend in a counter-clockwise direction from the lower end 12 of the coil-in-coil spring 10 to the upper end convolution 49 of the outer coil 40. Each convolution of the coil-in-coil spring 10 is made up of a portion of the continuous wire 20 substantially equal to about one turn of the continuous wire 20 (i.e., about 360° of the helical path of the continuous wire 20). The upper end convolution 49 of the outer coil 40 of the coil-in-coil spring 10 forms a substantially planar loop at the topmost portion of the coil-in-coil spring 10. Similarly, the lower end 12 of the coil-in-coil spring 10 also forms a substantially planar loop at the lowermost portion of the coil-in-coil spring 10. In this way, the coil-in-coil spring 10 terminates at either end in a generally planar form which serves as the supporting end structures of the coil-in-coil spring 10.

With further respect to the configuration of the coil-in-coil spring 10, in a typical coil spring formed with a helically-spiraling continuous wire, the spring constant and resultant feel of the coil spring are primarily determined by the wire diameter (or wire gauge), the total number of convolutions in the coil spring, the pitch between the convolutions of the coil spring, and the size of the convolutions (coil diameter). In this regard, the pitch (or vertical spacing) between each convolution of the coil spring is typically controlled by the rate at which the continuous wire, which forms the coil spring, is drawn through a forming die in a coil-forming machine. Once formed, a larger pitch will typically produce a stiffer coil spring due to the increased vertical orientation of the wire, while a smaller pitch will typically produce a softer coil spring and allow for a larger number of total convolutions in the coil body. Similarly, larger diameter convolutions in a coil spring also contribute to a lower spring constant and consequentially softer feel. Of course, because the wire forming the coil-in-coil spring is continuous there is no clearly defined beginning point or ending point of any single convolution. Furthermore, the diameter and pitch is typically adjusted gradually between one portion of the spring to another. As such, oftentimes a single convolution of the coil spring does not, in fact, have just one single diameter or just one single pitch, but may include, for example, a beginning or end portion with a variable diameter and/or pitch that transitions to the adjacent convolution. Therefore, as used herein, the diameter and pitch of a convolution will typically refer to an average diameter and pitch, but can also, in some embodiments, be inclusive of or refer to a maximum diameter and pitch or a minimum diameter and pitch.

In the exemplary coil-in-coil spring 10 shown in FIG. 1, the wire diameter of the continuous wire 20 ranges from about 0.072 inches to about 0.080 inches with a preferred range from about 0.072 inches to about 0.076 inches. Furthermore, the continuous wire 20 has a tensile strength of between about 240 kpsi to about 260 kpsi with a preferred tensile strength of about 250 kpsi.

With respect to the diameters and pitches included in the coil-in-coil spring 10, and focusing more specifically on the inner coil 30 of the coil-in-coil spring 10, the upper end convolution 39 has a diameter and each of the eight helical convolutions 31-38 has a diameter that progressively decreases as the eight helical convolutions 31-38 extend from the lower end 12 of the coil-in-coil spring 10 to the upper end convolution 39 of the inner coil 30. In particular, in the exemplary coil-in-coil spring 10 shown in FIG. 1, the upper end convolution 39 has a diameter of about 25.5 mm and each of the eight helical convolutions of the inner coil 30 has a diameter that ranges from about 27.5 mm to about 57.5 mm, with the first helical convolution 31 having a diameter of about 57.5 mm, the second helical convolution 32 having a diameter of about 52 mm, the third helical convolution 33 having a diameter of about 47 mm, the fourth helical convolution 34 having a diameter of about 42.5, the fifth helical convolution 35 having a diameter of about 38.5, the sixth helical convolution 36 having a diameter of about 35 mm, the seventh helical convolution 37 having a diameter of about 32 mm, and the eighth helical convolution 38 having a diameter of about 27.5 mm.

Referring still to the exemplary coil-in-coil spring 10 shown in FIG. 1, as noted above, the continuous wire 20 also defines a pitch between each of the eight helical convolutions 31-38, with the pitch between each of the eight helical convolutions 31-38 progressively decreasing as the plurality of helical convolutions 31-38 extend from the lower end 12 of the coil-in-coil spring 10 to the upper end convolution 39 of the inner coil 30. In the exemplary coil-in-coil spring 10 shown in FIG. 1, the pitch between each of the eight helical convolutions 31-38 of the inner coil 30 ranges from about 14 mm to about 28 mm. More specifically, the pitch between the lower end 12 of the coil-in-coil spring 10 and the first helical convolution 31 is about 22 mm; the pitch between the first helical convolution 31 and the second helical convolution 32 is about 28 mm; the pitch between the second helical convolution 32 and the third helical convolution 33 is about 25 mm; the pitch between the third helical convolution 33 and the fourth helical convolution 34 is about 23 mm; the pitch between the fourth helical convolution 34 and the fifth helical convolution 35 is about 21 mm; the pitch between the fifth helical convolution 35 and the sixth helical convolution 36 is about 18 mm; the pitch between the sixth helical convolution 36 and the seventh helical convolution 37 is about 16 mm; and the pitch between the seventh helical convolution 37 and the eighth helical convolution 38 is about 14 mm.

Referring still to the exemplary coil-in-coil spring 10 shown in FIG. 1, but focusing now on the outer coil 40 of the coil-in-coil spring 10, the upper end convolution 49 also has a diameter and each of the four helical convolutions 41-44 has a diameter that are all substantially equal to one another. Specifically, in the exemplary coil-in-coil spring 10, the upper end convolution 49 of the outer coil 40 has a diameter of about 66 mm and each of the four helical convolutions 41-44 of the outer coil 40 has a diameter of about 70 mm. The continuous wire 20 also defines a pitch between each of the four helical convolutions 41-44 of the outer coil 40, where each of the pitches are substantially equal to one another and, in the exemplary coil-in-coil spring 10, is about 66 mm.

Figure 2:
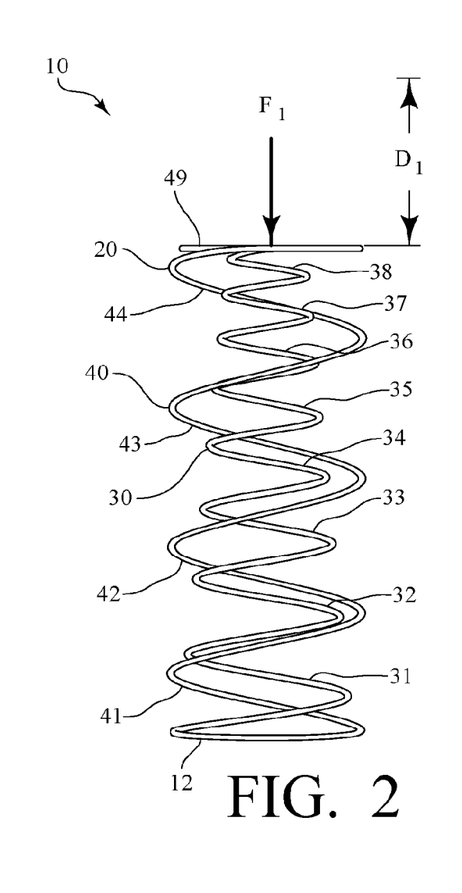
FIG. 2 is a side view of the exemplary coil-in-coil spring of FIG. 1, but showing the coil-in-coil spring compressed a predetermined distance $D_1$.
Figure 3:
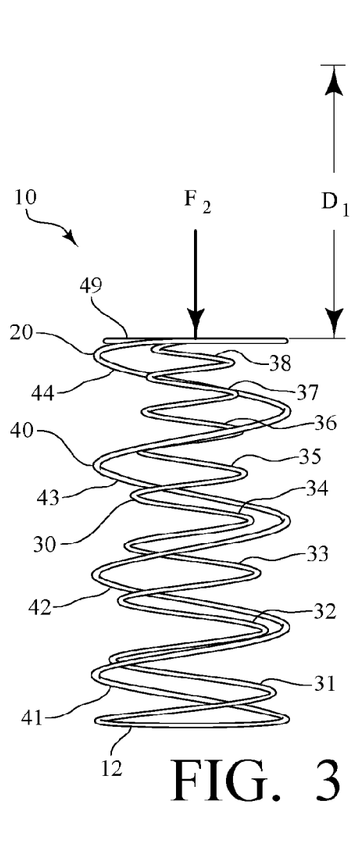
FIG. 3 is a side view of the exemplary coil-in-coil spring of FIG. 1, but showing the coil-in-coil spring compressed a predetermined distance $D_2$.

Referring now to FIGS. 1-3, which show the coil-in-coil spring 10 in different states of compression, when the coil-in-coil spring 10 is uncompressed, the outer coil 40 has an uncompressed height $H_1$ of about 235 mm and extends from the lower end 12 of the coil-in-coil spring 10 to the upper end convolution 49 of the outer coil 40. In this regard, and as shown in FIG. 1, the uncompressed height of the coil-in-coil spring 10 is the uncompressed height $H_1$ of the outer coil 40. As also shown in FIG. 1, the inner coil 30 has an uncompressed height $H_2$ of about 175 mm (or about 75% of the uncompressed height $H_1$ of the outer coil 40) and extends from the lower end 12 of the coil-in-coil spring 10 to the upper end convolution 39 of the inner coil 30, such that the upper end convolution 39 of the inner coil 30 is positioned a distance away from the upper end convolution 49 of the outer coil 40. As such, when the coil-in-coil spring 10 is partially compressed a first predetermined compression distance $D_1$, the outer coil 40 is compressed until the compressed height of the coil-in-coil spring 10 (i.e., the compressed height of the outer coil 40) is the same as the uncompressed height $H_2$ of the inner coil 30, as shown best in FIG. 2. At that point, the upper end convolution 39 of the inner coil 30 is then substantially contained within and is coplanar with the upper end convolution 49 of the outer coil 40. Subsequently, however, as the coil-in-coil spring 10 is compressed beyond the first predetermined compression distance $D_1$, both the outer coil 40 and the inner coil 30 compress simultaneously and the compressed height of the coil-in-coil spring 10 is the same as both the compressed height of the outer coil 40 and the compressed height of the inner coil 30, as shown best in FIG. 3.

Referring now more specifically to FIGS. 2-3, which also shows a first predetermined force $F_1$ applied to the coil-in-coil spring 10 such that the coil-in-coil spring 10 is compressed the first predetermined compression distance $D_1$, the outer coil 40 is compressed such that the upper end convolution 49 of the outer coil 40 is the same height as the upper end convolution 39 of the inner coil 30. In this regard, as the coil-in-coil spring 10 compresses from the uncompressed state to the first predetermined compression distance $D_1$ shown in FIG. 2, only the convolutions of the outer coil 40 compress and, as such, an initial spring constant $K_1$ of the coil-in-coil spring 10 is based solely on the outer coil 40. Then, as a second predetermined (and greater) force $F_2$ is applied to coil-in-coil spring 10 such that the coil-in-coil spring 10 is compressed a second predetermined compression distance $D_2$ greater than the first predetermined compression distance $D_1$, the coil-in-coil spring 10 compresses beyond the first predetermined compression distance $D_1$ shown in FIG. 2 and both the outer coil 40 and the inner coil 30 are partially compressed as shown in FIG. 3. Accordingly, at that point, a second spring constant $K_2$ of the coil-in-coil spring 10 (i.e., for compression distances beyond the first predetermined compression distance $D_1$) is based on both the inner coil 30 as well as the outer coil 40.

In operation, the coil-in-coil spring 10 functions substantially as two helical springs in parallel, where the effective spring constant is the sum of the spring constants of each spring that is actively engaged. Accordingly, when a force is applied to the coil-in-coil spring 10 and only the outer coil 40 begins to compress, the coil-in-coil spring 10 compresses at a constant rate according to the initial spring constant $K_1$ until the coil-in-coil spring 10 has compressed a first predetermined compression distance $D_1$, as shown in FIG. 2. Then, once the coil-in-coil spring 10 has compressed beyond the first predetermined compression distance $D_1$, the inner coil 30 is engaged and begins to compress along with the outer coil 40. In this way, initially the outer coil 40 alone provides support to a user's body positioned on the coil-in-coil spring 10, but upon compressing the first predetermined compression distance $D_1$ the inner coil 30 and the outer coil 40 act together to provide support to a portion of the user's body positioned on the coil-in-coil spring 10. As the coil-in-coil spring 10 is compressed past the first predetermined compression distance $D_1$, the coil-in-coil spring 10 compresses according to the second spring constant $K_2$ of the coil-in-coil spring 10. In particular, the inner coil 30 and the outer coil 40 compress simultaneously, and the coil-in-coil spring 10 will compress at a constant rate according to the secondary spring constant $K_2$ until the coil-in-coil spring 10 reaches a maximum compression distance of the coil-in-coil spring 10 where the inner coil 30, the outer coil 40, or both the inner coil 30 and the outer coil 40 are unable to compress further.

Figure 4:
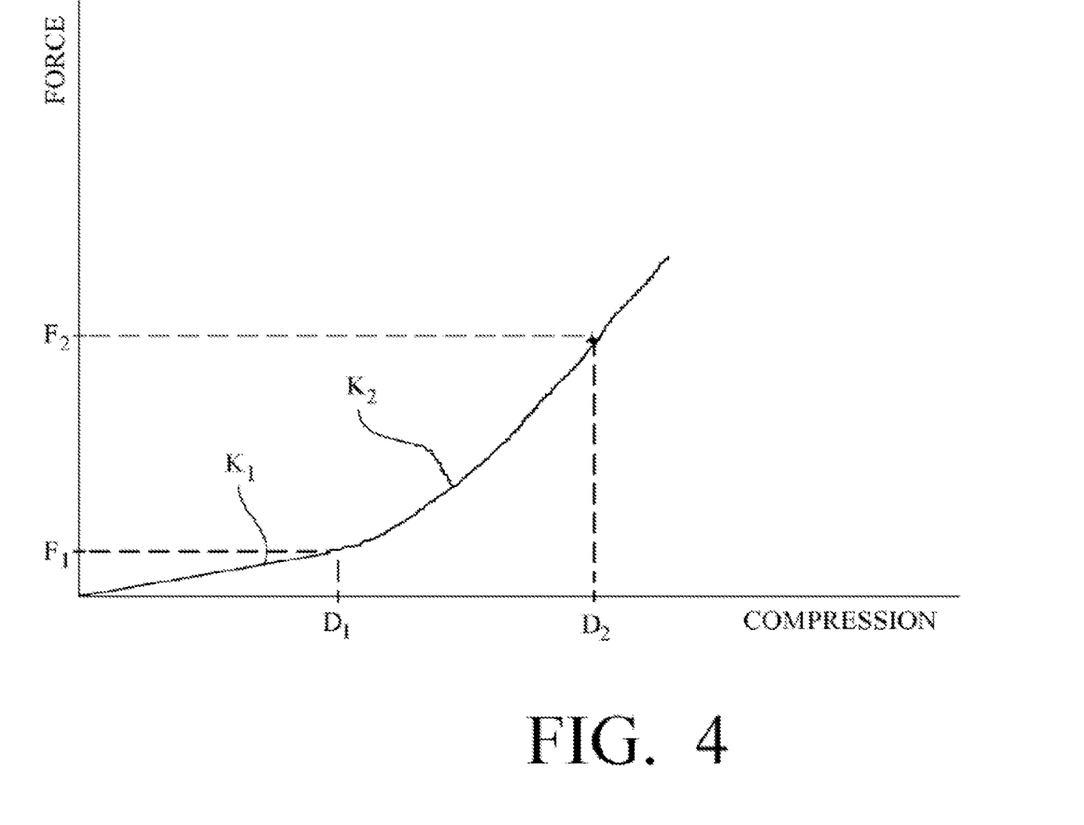
FIG. 4 is a graph depicting the forces necessary to maintain compression distances of the exemplary coil-in-coil spring of FIG. 1.

Referring now to FIG. 4, which graphically depicts the forces necessary to maintain compression distances of the coil-in-coil spring 10, the spring constant of the coil-in-coil spring 10 is the slope of the line at any given compression distance. Accordingly, as the force applied to the coil-in-coil spring 10 increases and the compression distance of the coil-in-coil spring 10 exceeds the first predetermined compression distance $D_1$, the inner coil 30 is engaged and the spring constant of the coil-in-coil spring 10 increases. As the spring constant increases (e.g., from $K_1$ to $K_2$), the coil-in-coil spring 10 becomes "harder." Thus, the coil-in-coil spring 10 of the present invention provides a variable and non-linear response to loading.

With further respect to the spring constants of exemplary coil-in-coil spring 10, the spring constant of the inner coil 30 is thus not the same as the spring constant of the outer coil 40. Typically, the spring constant of the inner coil 30 ranges from about 0.5 to about 0.77, whereas the spring constant of the outer coil 40 ranges from about 0.77 to about 1.18. For instance, when the wire diameter is about 0.072 inches, the spring constant of the inner coil 30 is about 0.77 and the spring constant of the outer coil 40 is about 0.50; when the wire diameter is about 0.076 inches, the spring constant of the inner coil 30 is about 0.96 and the spring constant of the outer coil 40 is about 0.62; and when the wire diameter is about 0.80 inches, the spring constant of the inner coil 30 is about 1.18 and the spring constant of the outer coil 40 is about 0.77. Of course, one skilled in the art would recognize that by modifying the inner coil 30 or the outer coil 40, the comparative values of the spring constants can be adjusted to provide further variability and customization of the spring constants and develop alternative loading responses in an exemplary coil-in-coil spring of the present invention.

Figure 5:
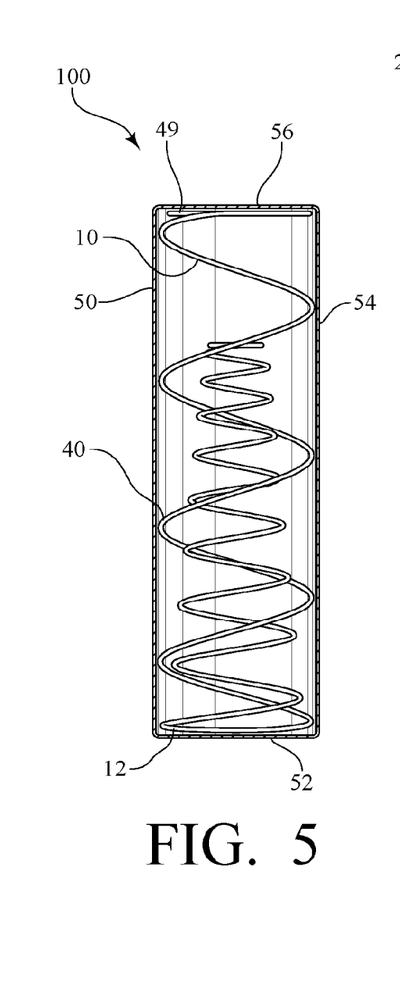
FIG. 5 is a side view of an exemplary pocketed coil-in-coil spring made in accordance with the present invention, with a portion of a side wall removed to show the coil-in-coil spring of FIG. 1 positioned within a flexible enclosure.

Referring now to FIG. 5, in another embodiment of the present invention, a pocketed coil-in-coil spring 100 is provided that includes a coil-in-coil spring 10 as described above with reference to FIGS. 1-3, and that further comprises a flexible enclosure 50 that encases the coil-in-coil spring 10. The flexible enclosure 50 includes a bottom wall 52 positioned adjacent to the lower end 12 of the coil-in-coil spring 10, a top wall 56 positioned adjacent to the upper end convolution 49 of the outer coil 40 of the coil-in-coil spring 10, and a continuous side wall 54 that extends from the bottom wall 52 to the top wall 56, such that the continuous side wall 54 surrounds the coil-in-coil spring 10.

The flexible enclosure 50 is preferably made of a material, such as a fabric, which can joined or welded together by heat and pressure (e.g., via ultrasonic welding or similar thermal welding procedure). For example, suitable fabrics may include one of various thermoplastic fibers known in the art, such as non-woven polymer-based fabric, non-woven polypropylene material, or non-woven polyester material. Alternatively, the flexible enclosure 50 may be joined together by stitching, metal staples, or other suitable methods. In short, a wide variety of fabrics or similar sheet material may be used to make and join together the flexible enclosure as would be recognized by those skilled in the art.

Figure 6:
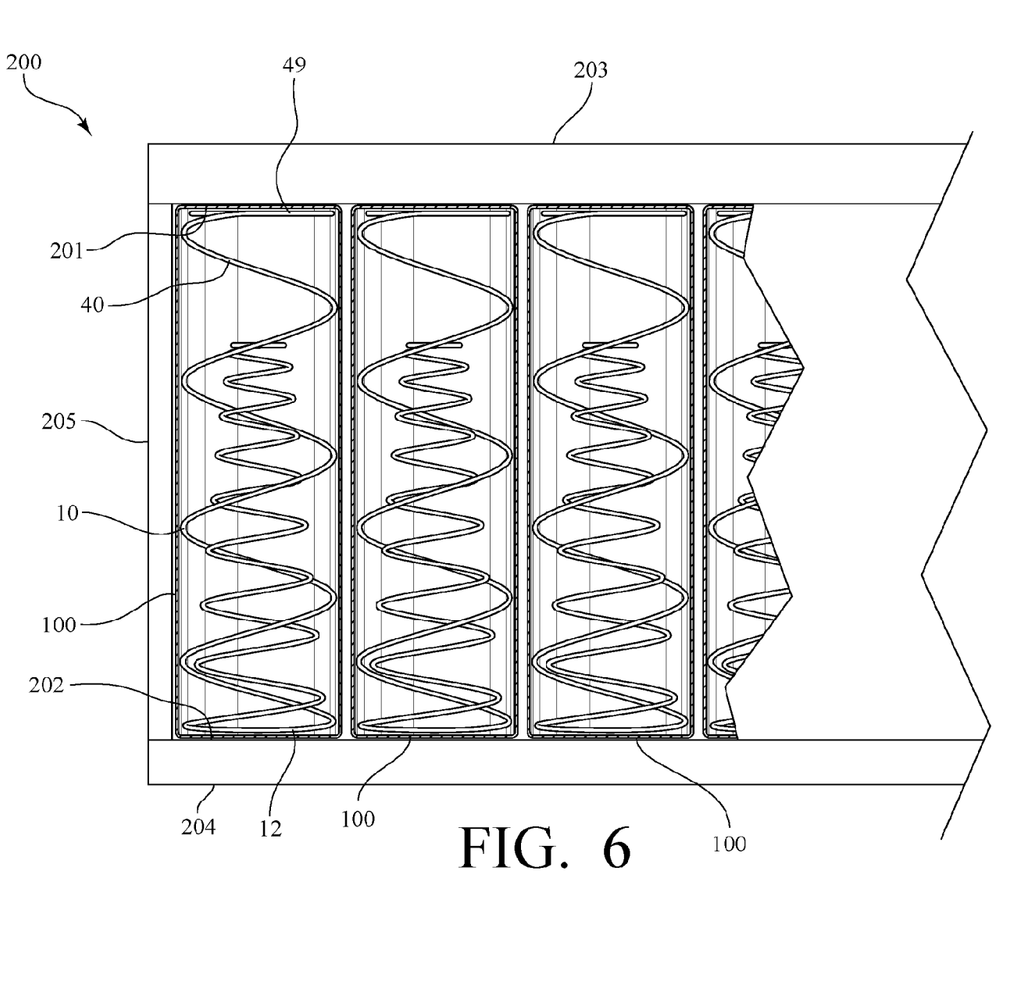
FIG. 6 is a side view of an exemplary mattress made in accordance with the present invention, with a portion removed to show the plurality of pocketed coil-in-coil springs of FIG. 5 in the interior of the mattress.

Referring now to FIG. 6, in another embodiment of the present invention, a mattress 200 is provided that includes a plurality of the pocketed coil-in-coil springs 100 described above with reference to FIG. 5. The pocketed coil-in-coil springs 100 are arranged in a matrix, such that the upper end convolutions 49 of the outer coils 40 of the coil-in-coil springs 10 define a first support surface 201, and the lower ends 12 of the coil-in-coil springs 10 define a second support surface 202 opposite the first support surface 201. The mattress 200 also comprises an upper body supporting layer 203 positioned adjacent to the first support surface 201, along with a lower foundation layer 204 positioned adjacent to the second support surface 202. Furthermore, a side panel 205 extends between the upper body supporting layer 203 and the lower foundation layer 204 around the entire periphery of the two layers 203, 204, such that the pocketed coil-in-coil springs 100 are completely surrounded.

In the mattress 200 shown in FIG. 8, the upper body supporting layer 203 and the sidewall 205 of the mattress 200 are each comprised of a visco-elastic foam to support the body of a user and provide a sufficiently soft surface on which to rest. The lower foundation layer 204, on the other hand, is typically comprised of a piece of wood or other similarly rigid material capable of supporting the matrix of pocketed coil springs 100. However, it is of course contemplated that the upper body supporting layer 203 and the sidewall 205 of the mattress 200, as well as the lower foundation layer 204, can also be comprised of other materials or combinations of materials known to those skilled in the art, including, but not limited to foam, upholstery, and/or other flexible materials.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A coil-in-coil spring, comprising a continuous wire forming an inner coil having a substantially conical shape and an outer coil extending around the inner coil and having a substantially cylindrical shape;
    wherein the inner coil includes a plurality of helical convolutions and an upper end convolution, the plurality of helical convolutions of the inner coil extending from a lower end of the coil-in-coil spring to the upper end convolution of the inner coil, said inner coil increasing in diameter and pitch from said upper end convolution to said lower end; and,
    wherein the outer coil includes a plurality of helical convolutions and an upper end convolution, the plurality of helical convolutions of the outer coil having said cylindrical shape and extending from the lower end of the coil-in-coil spring to the upper end convolution of the outer coil, said outer coil having a constant diameter and constant pitch;
    wherein said outer coil has a first spring constant, said inner coil has a second spring constant, said second spring constant being different than said first spring constant;
    wherein the varying diameter and pitch of said inner coil provides the coil-in-coil spring a variable and non-linear response to loading;
    wherein an uncompressed height of the inner coil is about 75% of an uncompressed height of the outer coil.

2. The coil-in-coil spring of claim 1, wherein the upper end convolution of the inner coil and each of the plurality of helical convolutions of the inner coil has a diameter, and wherein the diameter of each of the plurality of helical convolutions of the inner coil progressively decreases as the plurality of helical convolutions of the inner coil extend from the lower end of the coil-in-coil spring to the upper end convolution of the inner coil.

3. The coil-in-coil spring of claim 2, wherein the diameter of the upper end convolution of the inner coil is about 25.5 mm, and wherein the diameter of each of the plurality of helical convolutions of the inner coil ranges from about 27.5 mm to about 57.5 mm.

4. The coil-in-coil spring of claim 1, wherein the plurality of helical convolutions of the inner coil comprises eight helical convolutions.

5. The coil-in-coil spring of claim 4, wherein the eight helical convolutions comprises
    a first helical convolution having a diameter of about 57.5 mm,
    a second helical convolution having a diameter of about 52 mm,
    a third helical convolution having a diameter of about 47 mm,
    a fourth helical convolution having a diameter of about 42.5 mm,
    a fifth helical convolution having a diameter of about 38.5 mm,
    a sixth helical convolution having a diameter of about 35 mm,
    a seventh helical convolution having a diameter of about 32 mm, and
    an eighth helical convolution having a diameter of about 27.5 mm.

6. The coil-in-coil spring of claim 1, wherein the upper end convolution of the outer coil and each of the plurality of helical convolutions of the outer coil has a respective diameter, and wherein the diameter of each of the plurality of helical convolutions of the outer coil are substantially the same.

7. The coil-in-coil spring of claim 6, wherein the diameter of the upper end convolution of the outer coil is about 66 mm, and wherein the diameter of each of the plurality of helical convolutions of the outer coil is about 70 mm.

8. The coil-in-coil spring of claim 1, wherein the continuous wire defines a pitch between each of the plurality of helical convolutions of the inner coil, and wherein the pitch between each of the plurality of helical convolutions of the inner coil progressively decreases as the plurality of helical convolutions of the inner coil extend from the lower end of the coil-in-coil spring to the upper end convolution of the inner coil.

9. The coil-in-coil spring of claim 8, wherein the pitch between each of the plurality of helical convolutions of the inner coil ranges from about 14 mm to about 28 mm.

10. The coil-in-coil spring of claim 8, wherein the plurality of helical convolutions of the inner coil comprise eight helical convolutions, and wherein
    the pitch between the lower end of the coil-in-coil spring and the first helical convolution is about 22 mm,
    the pitch between the first helical convolution and the second helical convolution is about 28 mm,
    the pitch between the second helical convolution and the third helical convolution is about 25 mm,
    the pitch between the third helical convolution and the fourth helical convolution is about 23 mm,
    the pitch between the fourth helical convolution and the fifth helical convolution is about 21 mm,
    the pitch between the fifth helical convolution and the sixth helical convolution is about 18 mm,
    the pitch between the sixth helical convolution and the seventh helical convolution is about 16 mm, and
    the pitch between the seventh helical convolution and the eighth helical convolution is about 14 mm.

11. The coil-in-coil spring of claim 1, wherein the continuous wire defines a pitch between each of the plurality of helical convolutions of the outer coil, and wherein the pitch between each of the plurality of helical convolutions of the outer coil is substantially the same.

12. The coil-in-coil spring of claim 11, wherein the pitch between each of the plurality of helical convolutions of the outer coil is about 66 mm.

13. The coil-in-coil spring of claim 1, wherein the uncompressed height of the inner coil is about 175 mm, and the uncompressed height of the outer coil is about 235 mm.

14. The coil-in-coil spring of claim 1, wherein the continuous wire has a wire diameter of about 0.072 inches to about 0.076 inches and/or a tensile strength of between about 240 kpsi to about 260 kpsi.

15. The coil-in-coil spring of claim 1, further comprising a flexible enclosure encasing the continuous wire.

16. A mattress, comprising:
a plurality of coil-in-coil springs arranged in a matrix and defining a first support surface and a second support surface opposite the first support surface, each of the plurality of coil-in-coil springs comprising a continuous wire forming an inner coil having a substantially conical shape increasing in diameter and pitch from top to bottom, wherein said varying pitch and diameter of a first plurality of helical convolutions of said inner coil provide a variable and non-linear response to loading, and a cylindrically shaped outer coil extending around the inner coil, said cylindrical shape having a second plurality of helical convolutions of constant diameter and constant pitch, wherein said outer coil has a first spring constant, said inner coil has a second spring constant, said second spring constant being different than said first spring constant, and further wherein an uncompressed height of the inner coil is about 75% of an uncompressed height of the outer coil.

17. The mattress of claim 16, wherein the inner coil of each of the plurality of coil-in-coil springs includes a plurality of helical convolutions and an upper end convolution, the plurality of helical convolutions of the inner coil extending from a lower end of each of the plurality of coil-in-coil springs to the upper end convolution of the inner coil, and wherein the outer coil of each of the plurality of coil-in-coil springs includes a plurality of helical convolutions and an upper end convolution, the plurality of helical convolutions of the outer coil extending from the lower end of each of the plurality of coil-in-coil springs to the upper end convolution of the outer coil.

18. The mattress of claim 16, further comprising:
an upper body supporting layer positioned adjacent to the first support surface;
a lower foundation layer positioned adjacent to the second support surface; and
a side panel extending between the upper body supporting layer and the lower foundation layer.

* * * * *